US006987227B2

(12) United States Patent
Wakasa

(10) Patent No.: US 6,987,227 B2
(45) Date of Patent: Jan. 17, 2006

(54) WEIGHT DETECTING APPARATUS WITH VIBRATIONAL SENSORS ATTACHED TO BOTH THE FREE END AND THE FIXED END OF THE LOAD CELL

(75) Inventor: Yukio Wakasa, Ritto (JP)

(73) Assignee: Ishida, Co., Ltd., Kyoto (JP)

( * ) Notice: Subject to any disclaimer, the term of this patent is extended or adjusted under 35 U.S.C. 154(b) by 0 days.

(21) Appl. No.: 10/516,357

(22) PCT Filed: Mar. 26, 2004

(86) PCT No.: PCT/JP2004/004372

§ 371 (c)(1),
(2), (4) Date: Dec. 1, 2004

(87) PCT Pub. No.: WO2004/090483

PCT Pub. Date: Oct. 21, 2004

(65) Prior Publication Data

US 2005/0252695 A1    Nov. 17, 2005

(30) Foreign Application Priority Data

Apr. 2, 2003    (JP) .............................. 2003-098841

(51) Int. Cl.
*G01G 23/01*    (2006.01)
*G01G 11/00*    (2006.01)
(52) U.S. Cl. .................... 177/25.13; 177/145; 177/185; 702/101; 702/195
(58) Field of Classification Search ............. 177/25.13, 177/185, 145; 702/101, 102, 195
See application file for complete search history.

(56) References Cited

U.S. PATENT DOCUMENTS

| | | | | |
|---|---|---|---|---|
| 4,593,778 A | * | 6/1986 | Konishi et al. | 177/185 |
| 4,926,359 A | * | 5/1990 | Konishi et al. | 702/194 |
| 5,117,929 A | * | 6/1992 | Nakamura et al. | 177/185 |
| 5,440,077 A | * | 8/1995 | Konishi et al. | 177/185 |
| 5,736,685 A | | 4/1998 | Nakajima | 177/145 |
| 5,789,713 A | * | 8/1998 | Wakasa et al. | 177/25.13 |
| 5,936,206 A | * | 8/1999 | Tajiri | 177/25.13 |
| RE36,411 E | * | 11/1999 | Nakamura et al. | 177/185 |
| 6,013,879 A | * | 1/2000 | Nakamura et al. | 177/25.13 |
| 6,034,334 A | * | 3/2000 | Nakamura et al. | 177/25.18 |

FOREIGN PATENT DOCUMENTS

| | | | |
|---|---|---|---|
| DE | 19846769 A | | 5/2000 |
| JP | 8-110261 A | | 4/1996 |
| JP | 8-136330 A | | 5/1996 |
| JP | 2004309148 A | * | 11/2004 |

\* cited by examiner

*Primary Examiner*—Randy W. Gibson
(74) *Attorney, Agent, or Firm*—Shinjyu Global IP Counselors, LLP

(57) ABSTRACT

The weight detecting apparatus includes a weight detecting load cell having a fixed end fixed to a fixed base arranged on a floor and a free end bearing a weight of an object, a first vibration detecting load cell arranged on the fixed end side of the weight detecting load cell for detecting a vibration component on the fixed end side, i.e., a floor vibration component, and a second vibration detecting load cell arranged on the free end side of the weight detecting load cell for detecting a motor vibration component on the free end side, i.e., the motor vibration component. The weight detecting apparatus precisely detects the weight of the object by removing the vibration component from the detection signal of the weight detecting load cell based on the detection signals of the respective load cells.

10 Claims, 8 Drawing Sheets

[ PRIOR ART ]

[ PRIOR ART ]

WEIGHT DETECTING APPARATUS WITH VIBRATIONAL SENSORS ATTACHED TO BOTH THE FREE END AND THE FIXED END OF THE LOAD CELL

FIELD OF THE INVENTION

The present invention relates to a weight detecting apparatus, and particularly to a weight detecting apparatus for detecting a weight of an object placed thereon with high precision, and belongs to a field of weight detecting technology.

DESCRIPTION OF THE BACKGROUND ART

Weight detecting apparatuses, which detect weights of objects by weight detectors such load cells, have been widely used in various fields. Patent reference 1 (Japanese Laid-Open Patent Publication No. H8-110261) and patent reference 2 (Japanese Laid-Open Patent Publication No. H8-136330) have disclosed examples of weight detecting apparatuses, which are configured to eliminate disturbance due to vibrations for further improving detection precision.

Referring to FIG. 5, the weight detecting apparatus disclosed in the patent reference 1 includes a weight detecting load cell (load cell for measurement) A1 and a vibration detecting load cell (load cell for dummy) A2, which are fixed at their fixed ends to a fixed base (floor) B. An object table C placing an object X is coupled to a free end of weight detecting load cell A1. A balance weight (i.e., a metal weight of a known weight) D is attached to a free end of vibration detecting load cell A2.

Thereby, when the fixed base B vibrates as indicated by an arrow due to vibrations of the floor, the weight detecting load cell A1 issues a detection signal produced by superimposing floor vibration components on the weight of the object X, on the other hand, the vibration detecting load cell A2 issues a detection signal according to floor vibration components. For example, as shown in FIG. 6, the weight and vibration detecting load cells A1 and A2 have cell sensitivity characteristics usually varying according to magnitudes and others of target loads. For allowing arithmetic processing between the detection signals provided by these load cells A1 and A2, arithmetic processing for correction is effected on the detection signals. More specifically, processing is performed to subtract the detection signal from the vibration detecting load cell A2, which is arithmetically processed for correction in a predetermined manner, from the detection signal of the weight detecting load cell A1. In other words, vibration components on a device installation side are removed from the detection signal of the weight detecting load cell A1 so that only the signal matching with the weight of the object X can be obtained.

As shown in FIG. 7, the weight detecting apparatus disclosed in the patent reference 2 has a weight detecting load cell (first load cell) A1 having a fixed end, which is fixed to the fixed base B on the floor. A transporting conveyor (transporting means) C1 is fixed to a free end of the weight detecting load cell A1 via a vibration detecting load cell (second load cell) A3. In this structure, the transporting conveyor C1 is coupled to a free end of the vibration detecting load cell A3.

For example, when the transporting conveyor C1 with the object X placed thereon changes its position as represented by an arrow (i.e., when a certain kind of vibrations occur) due to driving of a motor (not shown in Figures), which is a drive source of the transporting conveyor C1, the weight detecting load cell A1 issues the detection signal, in which a motor vibration component is superimposed on the weight of the object X, and the vibration detecting load cell A3 issues the detection signal corresponding to the motor vibration component. Similarly to the weight detecting apparatus disclosed in the patent reference 1, arithmetic processing for correction is effected on the detection signals for allowing arithmetic processing between the detection signals provided by the weight and vibration detecting load cells A1 and A3, which have different characteristics. More specifically, processing is performed to subtract the detection signal of the vibration detecting load cell A3, which is arithmetically processed for correction in a predetermined manner, from the detection signal of the weight detecting load cell A1. In this manner, vibration components on an object placing side are removed from the detection signal of the weight detecting load cell A1 so that only the signal matching with the weight of the object X can be obtained.

The weight detecting apparatuses in the patent references 1 and 2 suffer from the following problems.

In the weight detecting apparatus disclosed in the patent reference 1, if the object table C is formed of the transporting conveyor C1 as disclosed, e.g., in the patent reference 2, vibration components that originate from the transporting conveyor C1 are superimposed on the detection signal of the weight detecting load cell A1. However, the device does not have a component or structure for removing the vibration components occurring on the object placing side. This lowers the detection precision.

In the weight detecting apparatus disclosed in the patent reference 2, vibration components of the vibration of the fixed base B are superimposed on the detection signals of the weight and vibration detecting load cells A1 and A3. However, the device does not have a component or structure for removing the vibration components occurring on the device installation side. This likewise lowers the detection precision.

SUMMARY OF THE INVENTION

In view of the above, it is an object of the invention to provide a weight detecting apparatus, which can eliminate an influence due to vibration disturbance exerted from the device installation side and the object placing side, and thereby can improve the detection precision.

According to a first aspect of the present invention, a weight detecting apparatus for detecting a weight of an object includes weight detecting means, first vibration detecting means, second vibration detecting means and weight calculating means. The weight detecting means has a fixed end kept in a fixed state, and has a free end bearing a weight of the object. The first vibration detecting means is arranged on a fixed end side of the weight detecting means for detecting a vibration component. The second vibration detecting means is arranged on a free end side of the weight detecting means for detecting a vibration component. The weight calculating means removes the vibration components from a detection signal provided from the weight detecting means based on the detection signals provided from the weight detecting means and the first and second vibration detecting means, and thereby calculates the weight of the object.

According to the first aspect of the present invention, the first and second vibration detecting means detect the vibration components on the fixed end side and the free end side of the weight detecting means, and the vibration components thus detected are removed from the detection signal of the weight detecting means so that only the signal matching with the weight of the object can be obtained, and the object weight can be detected with improved precision.

According to a second aspect of the present invention, the weight detecting apparatus of the first aspect of the present invention further has such a feature that the weight calculating means calculates the vibration component on the free end side of the weight detecting means based on the detection signals provided from the first and second vibration detecting means.

According to the second aspect of the present invention, the weight detecting apparatus of the first aspect of the present invention has more specific structures. When the vibration components on the fixed end side of the weight detecting means are present together with the vibration component on the free end side, it is possible to calculate the vibration component on the free end side, which is impossible in the prior art.

According to a third aspect of the present invention, the weight detecting apparatus of the first or second aspect of the present invention further has such a feature that the weight calculating means calculates the weight of the object by performing arithmetic processing for correction on the detection signals provided from the weight detecting means, the first vibration detecting means and the second vibration detecting means, and thereby removing the vibration component on the fixed end side and the vibration component on the free end side from the detection signal of the weight detecting means.

In general, characteristics such as sensitivity of each detecting means are set in accordance with a level of weight to be detected, a vibration mode or the like.

According to the third aspect of the present invention, even when each detecting means has characteristics different from those of the other detecting means, the weight calculating means can perform the arithmetic processing between the detection signals provided from the different detecting means, respectively, and the arithmetic processing for correction can be effected on the respective detection signals. Due to differences between target loads, restrictions on the installation space and others, the first and second vibration detecting means may be smaller in size than the weight detecting means. The third aspect of the present invention is particularly effected for such a case.

According to a fourth aspect of the present invention, the weight detecting apparatus according to the first, second or third aspect of the present invention has such a feature that the weight detecting means has an A/D converter, an arithmetic circuit and a low-pass filter. The A/D converter receives the detection signals provided from the weight detecting means, the first vibration detecting means and the second vibration detecting means. The arithmetic circuit receives an output signal of the A/D converter. The low-pass filter receives an output signal of the arithmetic circuit.

According to a fifth aspect of the present invention, the weight detecting apparatus according to the first, second or third aspect of the present invention has such a feature that the weight calculating means has an A/D converter, a low-pass filter and an arithmetic circuit. The A/D converter receives the detection signals provided from the weight detecting means, the first vibration detecting means and the second vibration detecting means. The low-pass filter receives an output signal of the A/D converter. The arithmetic circuit receives an output signal of the low-pass filter.

The fourth and fifth aspects of the present invention provide more specific structures of the weight calculating means. Particularly, according to the fifth aspect of the present invention, even when the arithmetic circuit has an insufficient capability with respect to a sampling period of the detection signal of each detecting means, provision of the low-pass filter maintains an appropriate arithmetic efficiency of the arithmetic circuit.

DESCRIPTION OF THE PREFERRED EMBODIMENTS

A weight detecting apparatus according to an embodiment of the invention will now be described.

Figure 1:
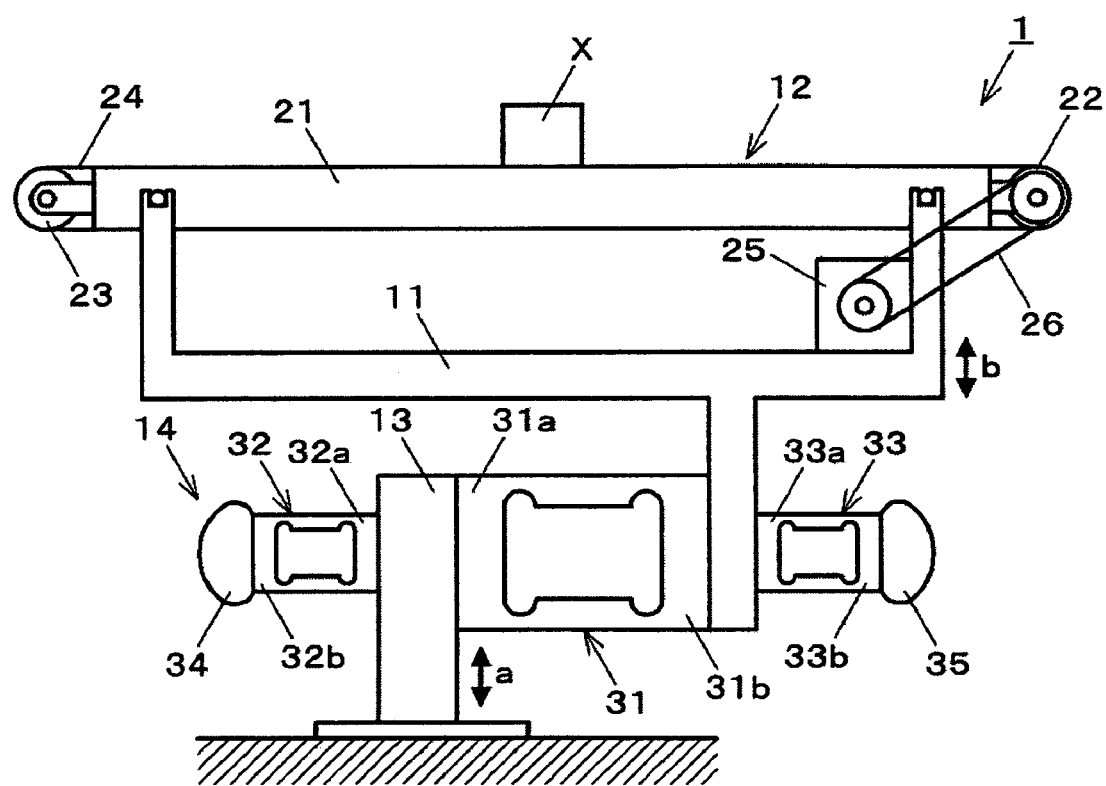
FIG. 1 is a schematic side view of a weight detecting apparatus according to an embodiment of the invention.

As shown in FIG. 1, a weight detecting apparatus 1 has a transporting conveyor 12 supported by upper portions of a support frame 11, and a weight detecting mechanism 14. The weight detecting mechanism 14 is coupled to the support frame 11, and is mounted on a fixed base 13 arranged on a floor. The weight detecting mechanism 14 detects a weight of an object X, which is transported on the transporting conveyor 12.

The transporting conveyor 12 has a pair of rollers 22 and 23, i.e., a front drive roller 22 and a rear driven roller 23, which are rotatably carried between a pair of side frames 21, only one of which is shown. The transporting conveyor 12 also has an endless belt 24 passing around the rollers 22 and 23. The support frame 11 supports a motor 25 serving as a transportation drive source. A timing belt 26 is arranged around an output pulley, which is fixed coaxially to an output shaft of the motor 25, and an input pulley, which is fixed coaxially to the drive roller 22. A drive power of the motor 25 is transmitted to the drive roller 22 via the timing belt 26.

The weight detecting mechanism 14 has three load cells (weight detecting means and vibration detecting means, and weight detecting device and vibration detecting devices) 31–33. First, the weight detecting load cell 31, which is employed for detecting the weight of the object X, has a fixed end 31a fixed to the fixed base 13 and a free end 31b coupled to a lower end portion of the support frame 11. The first vibration detecting load cell 32, which is smaller in size than weight detecting load cell 31, is employed for detecting vibration components caused by vibrations of the floor represented by an arrow "a". The first vibration detecting load cell 32 has a fixed end 32a fixed to the fixed base 13, and also has a free end 32b to which a weight member 34 of a known weight is attached. Similarly to the first vibration detecting load cell 32, a second vibration detecting load cell 33, which is smaller in size than weight detecting load cell 31, is employed for detecting vibration components due to driving of motor 25 indicated by an arrow b. The second vibration detecting load cell 33 has a fixed end 33a, which is fixed to the free end 31b of the weight detecting load cell 31 via the lower end portion of the support frame 11, and also has a free end 33b to which a weight member 35 of a known weight is attached.

According to the above structure, the free end 31b of the weight detecting load cell 31 bears the weights of the support frame 11, the transporting conveyor 12, the motor 25, the object X, the second vibration detecting load cell 33, the weight member 35 and others, and also bears floor vibration components applied via the fixed base 13 and motor vibration components applied via the support frame 11. Since the support frame 11, the transporting conveyor 12, the motor 25, the second vibration detecting load cell 33, the weight member 35 and others have known weights, it is easy to remove a part formed of the weights of these members from the detection signal obtained by the weight detecting load cell 31. For the sake of simple and clear illustration, it is expressed in the following description that "the free end 31b of the weight detecting load cell 31 bears the weight of the object X, the floor vibration components and the motor vibration components, and the weight detecting load cell 31 issues the detection signal corresponding to these weight and components."

The free end 32b of the first vibration detecting load cell 32 bears the weight of the weight member 34 as well as the floor vibration components applied via the fixed base 13, and the weight member 34 has the known weight. For the sake of illustration, therefore, it is expressed that the free end 32b of the first vibration detecting load cell 32 bears the floor vibration components, and the first vibration detecting load cell 32 issues the detection signal corresponding to these components.

Further, the free end 33b of the second vibration detecting load cell 33 bears the weight of the weight member 35, the floor vibration components applied via the fixed base 13 and the motor vibration components applied via the support frame 11, and the weight member 35 has the known weight. For the sake of illustration, therefore, it is expressed that the free end 33b of the second vibration detecting load cell 33 bears the floor vibration components and the motor vibration components, and the second vibration detecting load cell 33 issues the detection signal corresponding to these components.

Description will now be given on an example of a signal processing circuit, which processes the signals issued by these load cells 31–33.

Figure 2:
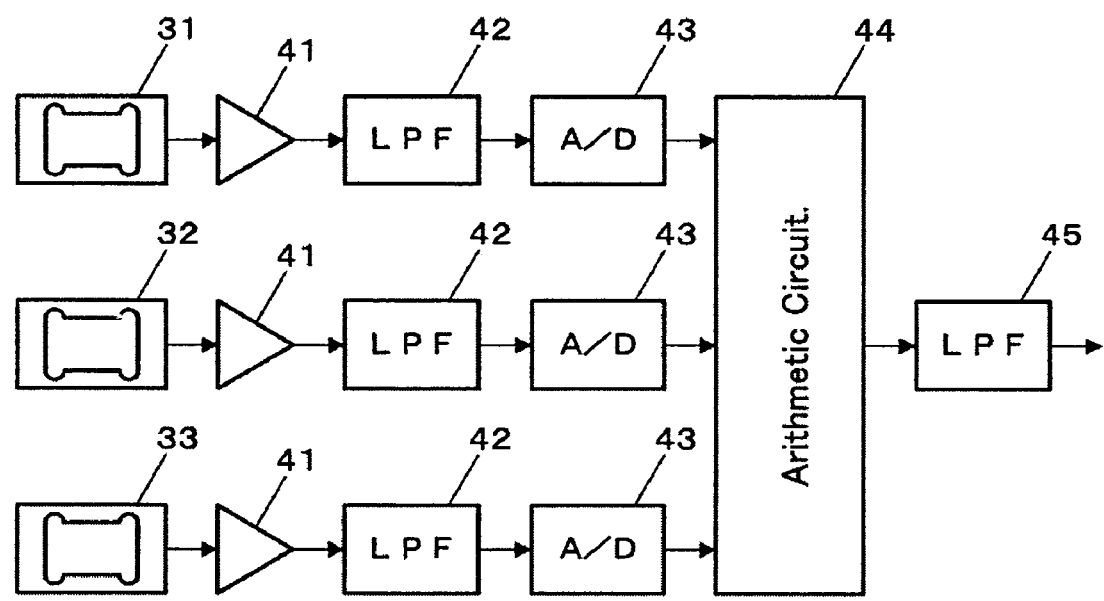
FIG. 2 is a block diagram showing by way of example a signal processing circuit.

As shown in FIG. 2, the load cells 31–33 are connected to amplifiers 41 . . . 41, respectively. The amplifiers 41 . . . 41 amplify detection signals issued from the load cells 31–33, respectively. The amplifiers 41 . . . 41 are also connected to low-pass filters 42 . . . 42 respectively. The low-pass filters 42 . . . 42 remove a signal higher than a predetermined frequency from the received detection signals. The low-pass filter 42 . . . 42 are each connected to A/D converters 43 . . . 43. The A/D converters 43 . . . 43 convert an input analog signal to a digital signal. The A/D converters 43 . . . 43 are connected to an arithmetic circuit 44. The arithmetic circuit 44 executes various kinds of arithmetic processing on the received detection signals. The arithmetic circuit 44 is connected to a low-pass filter 45. The low-pass filter 45 removes a signal higher than a predetermined frequency from the received detection signal. The low-pass filters 42 . . . 42 are provided in relation to sampling periods of the A/D converters 43. The low-pass filter 45 is employed for removing the vibration components due to an impact that occurs when the object X is placed on the transporting conveyor 12.

The arithmetic circuit 44 forms the weight calculating means together with the A/D converters 43 . . . 43 and the low-pass filters 45 . . . 45. It performs predetermined arithmetic processing for correction on the received detection signal to remove the floor vibration components and the motor vibration components from the detection signal issued from the weight detecting load cell 31. Specifically, the arithmetic circuit 44 is formed of a DSP (Digital Signal Processor), a microcomputer or the like.

Figure 6:
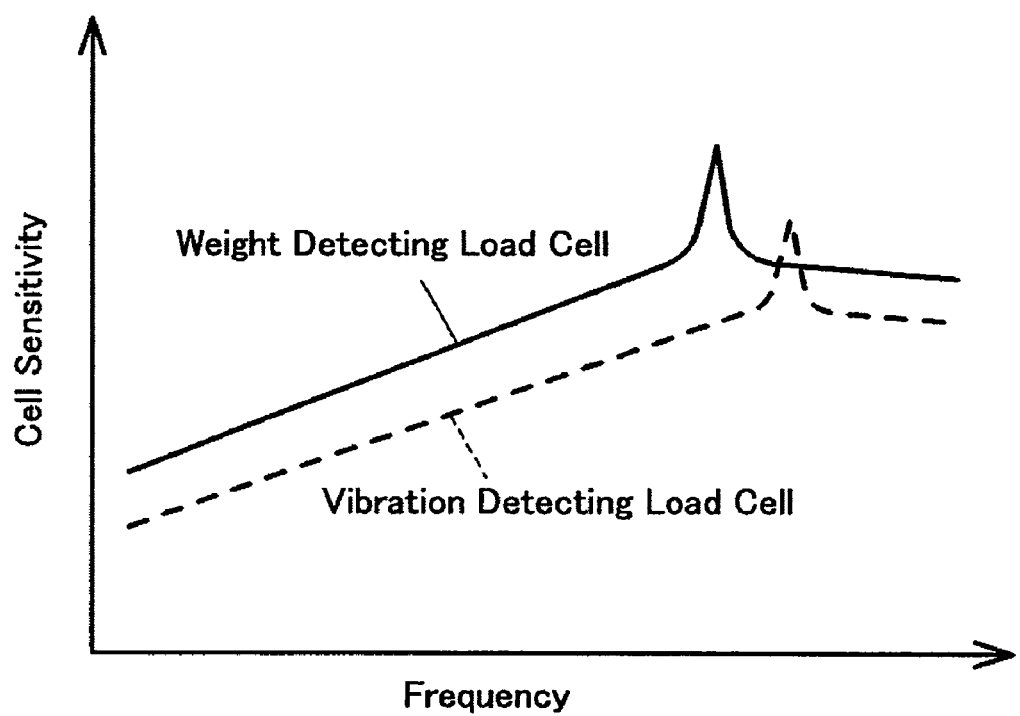
FIG. 6 shows sensitivity and frequency characteristics of respective load cells.
Figure 7:
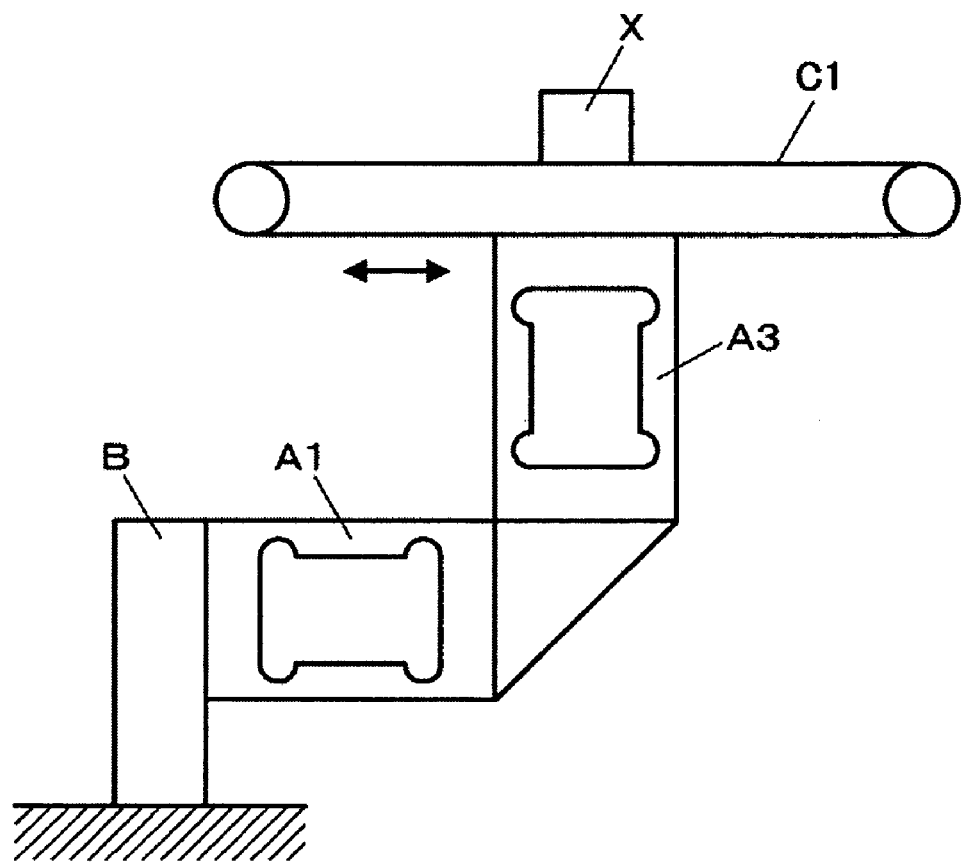
FIG. 7 is a schematic side view of another conventional weight detecting apparatus.

In general, the weight detecting load cell 31, the first vibration detecting load cell 32 and the second vibration detecting load cell 33 are configured such that these have different characteristics depending on magnitudes of the loads to be detected (see FIG. 6). Thus, load cells 31–33 exhibit different transfer functions each representing a relationship between the input and the output, respectively. Therefore, in the case where the arithmetic processing is performed among the detection signals of the load cells 31–33, as is done in this embodiment, the arithmetic processing for correction is required for matching the transfer function of each of the load cells 31–33 with those of the other load cells 31–33.

Figure 3:
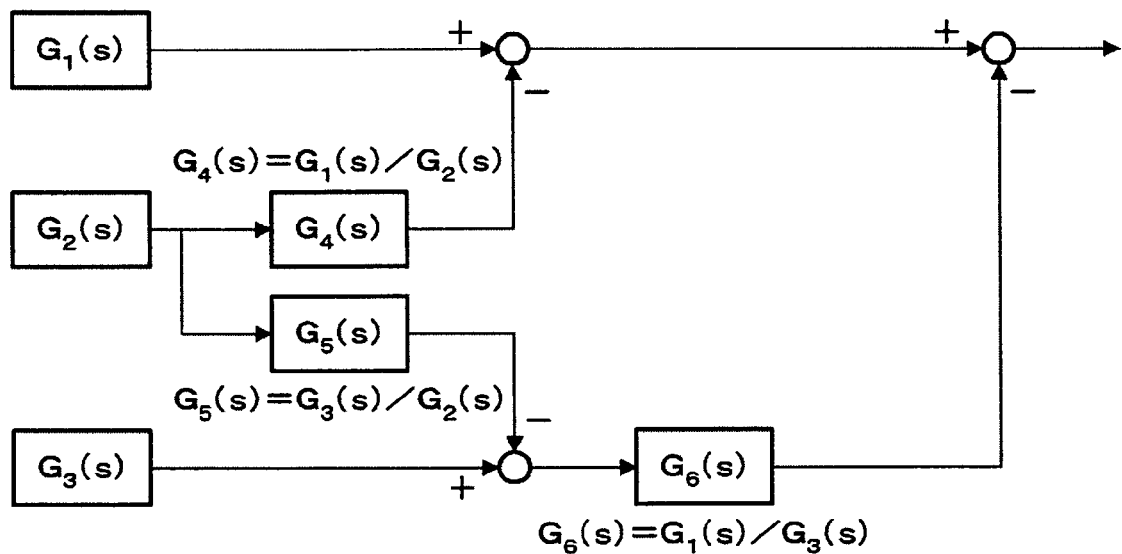
FIG. 3 is a block diagram for illustrating procedures of calculating a weight of an object.

Referring to a block diagram of FIG. 3, description will now be given on an example of the arithmetic processing, which is effected by the arithmetic circuit 44 on the detection signals of the weight detecting load cell 31, the first vibration detecting load cell 32 and the second vibration detecting load cell 33 through transfer functions G1(s), G2(s) and G3(s), respectively.

First, the transfer functions G1(s) and G2(s) of the load cells 31 and 32 are matched with each other for performing the arithmetic processing between the detection signals of the weight detecting load cell 31 and the first vibration detecting load cell 32. In this case, the transfer function G2(s) of the first vibration detecting load cell 32 is matched with the transfer function G1(s) of the weight detecting load cell 31, and for this purpose, a new transfer function G4(s), which is a ratio between the transfer functions G1(s) and G2(s), is calculated according to a formula in FIG. 3. Based on the transfer function G4(s), the arithmetic processing for correction is effected on the detection signal of the first vibration detecting load cell 32, and the detection signal thus processed for correction is subtracted from the detection signal of the weight detecting load cell 31. Consequently, the floor vibration components detected by the first vibration detecting load cell 32 are removed from the detection signal obtained by the weight detecting load cell 31, which corresponds to the weight of the object X, floor vibration components and motor vibration components. The detection signal, from which the floor vibration components are removed, corresponds to the weight of the object X and the motor vibration components.

For performing the arithmetic processing between the detection signals of the first and second vibration detecting load cells 32 and 33, processing is performed to match the transfer functions G2(s) and G3(s) of the load cells 32 and 33 with each other. In this case, the transfer function G2(s) of the first vibration detecting load cell 32 is matched with the transfer function G3(s) of the second vibration detecting load cell 33, and for this purpose, a new transfer function G5(s), which is a ratio between the transfer functions G3(s) and G2(s), is calculated according to a formula in FIG. 3. Based on the transfer function G5(s), the arithmetic processing for correction is effected on the detection signal of the first vibration detecting load cell 32, and the detection signal thus processed for correction is subtracted from the detection signal of the second vibration detecting load cell 33. Consequently, the floor vibration components detected by the first vibration detecting load cell 32 are removed from the detection signal obtained by the second vibration detecting load cell 33, which corresponds to the floor vibration components and motor vibration components. The detection signal, from which the floor vibration components are removed, corresponds to only the motor vibration components.

Then, the transfer functions G1(s) and G3(s) of the load cells 31 and 33 are matched with each other for performing the arithmetic processing between the detection signals of the weight detecting load cell 31 and the second vibration detecting load cell 33. In this case, the transfer function G3(s) of the second vibration detecting load cell 33 is processed to match with the transfer function G1(s) of the weight detecting load cell 31, and for this purpose, a new transfer function G6(s), which is a ratio between the transfer functions G1(s) and G3(s), is calculated according to a formula in FIG. 3. Based on the transfer function G6(s), the arithmetic processing for correction is effected on the detection signal of the second vibration detecting load cell 33, which has already been processed by the foregoing subtraction processing. The detection signal of the second vibration detecting load cell 33 thus processed for correction is subtracted from the detection signal of the weight detecting load cell 31, which has already been processed by the foregoing subtraction processing. Consequently, the detection signal of the second vibration detecting load cell 33, which has been changed by the subtraction processing to the signal corresponding to the motor vibration signal, is subtracted from the detection signal of the weight detecting load cell 31, which has been changed by the subtraction processing to the signal corresponding to the weight of the object X and the motor vibration components. Thereby, the detection signal corresponding to only the weight of the object X is obtained in an isolated form.

The detection signal of the weight detecting load cell 31, which is arithmetically processed as described above, is supplied to the low-pass filter 45, and is output therefrom after being filtered in a predetermined manner.

As described above, the vibration components on the fixed end side (31*a*) and the free end side (31*b*) of the weight detecting load cell 31, i.e., the floor vibration components and the motor vibration components are detected by using the first and second vibration detecting load cells 32 and 33, and then are removed from the detection signal of the weight detecting load cell 31 so that only the signal matching with the weight of the object X is obtained. Thereby, the weight of the object X can be detected with improved precision.

If both kinds of the vibration components (i.e., floor vibration components and motor vibration components) coexist as is the case with the present embodiment, it is possible to isolate and calculate the motor vibration components, i.e., the vibration components on the free end side (31*b*), which has not been possible in the prior art.

Even in the structure in which each of the load cells 31–33 has different characteristics as in the present embodiment, the arithmetic processing can be appropriately effected for correction on the detection signals. Due to differences between detection targets, restrictions on the installation space and others, the first and second vibration detecting load cells 32 and 33 may be smaller in size than that of weight detecting load cell 31. Even in such cases, the arithmetic processing for correction allows highly precise detection of the weight of the object X.

ALTERNATIVE EMBODIMENTS (a) In the foregoing embodiment, the floor vibration components are first subtracted from the detection signal of the weight detecting load cell 31, and then the motor vibration components are subtracted. However, it is possible to employ a manner in which the floor vibration components and the motor vibration components are first added together, and then are subtracted from the detection signal of the weight detecting load cell 31.

Figure 4:
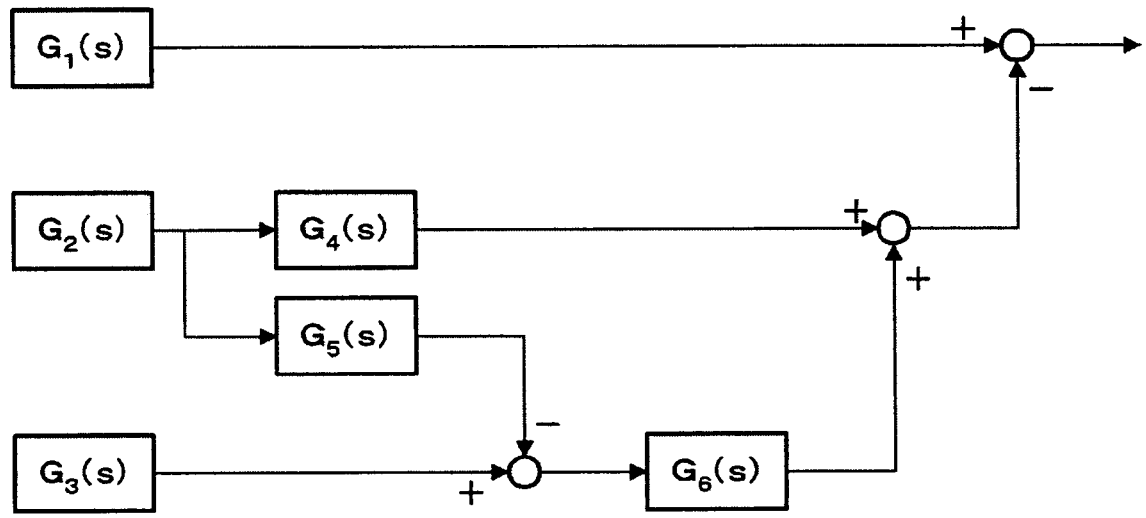
FIG. 4 is another block diagram for illustrating procedures of calculating a weight of an object.
Figure 5:
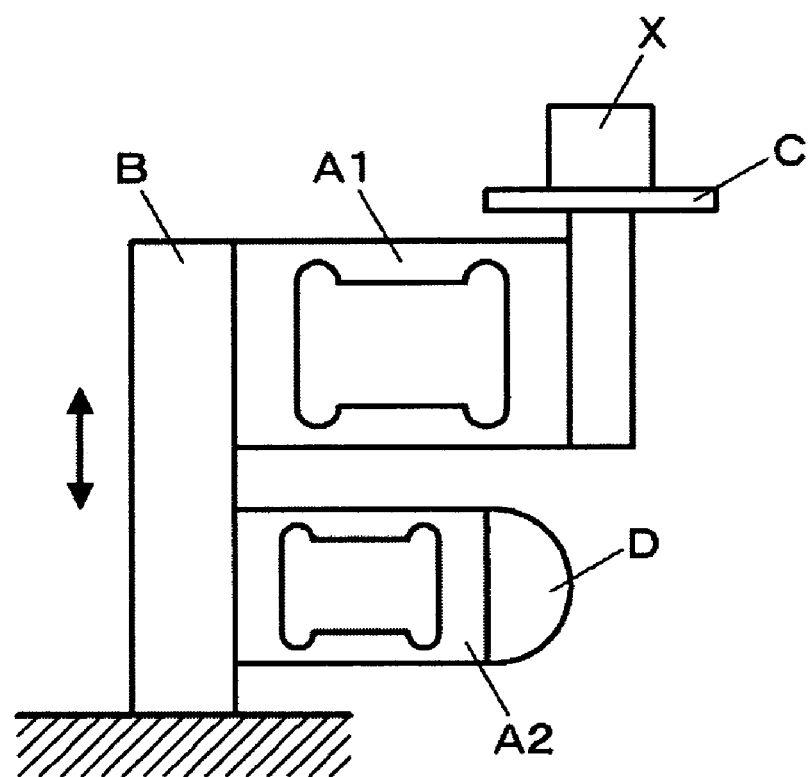
FIG. 5 a schematic side view of a conventional weight detecting apparatus.

Thus, as shown in FIG. 4, the arithmetic processing for correction is effected on the detection signal of the first vibration detecting load cell 32 according to the transfer function G4(s), such that the detection signal of the first vibration detecting load cell 32 can be subtracted from the detection signal of the weight detecting load cell 31. Meanwhile, with the transfer function G6(s), the arithmetic processing for correction is effected on the detection signal of the second vibration detecting load cell 33, which has already been processed by the foregoing subtraction processing, such that the detection signal of the second vibration detecting load cell 33 can be subtracted from the detection signal of the weight detecting load cell 31. The detection signals of the first and second vibration detecting load cells 32 and 33 thus processed for correction are added together, and then are subtracted from the detection signal of the weight detecting load cell 31. In this case, only the signal matching with the weight of the object X is obtained so that the weight of the object X can be detected with improved precision.

(b) According to the foregoing embodiment, various kinds of arithmetic processing are performed with the transfer functions G1(s)–G6(s) for providing a signal matching with the weight of the object X. Under limited conditions (or in accordance with required level of detection precision), however, constants may be used instead of the transfer functions G1(s)–G6(s). For example, where the detection signals have relatively low frequencies owing to arrangement of the low-pass filters 42 . . . 42, and it may be possible to ignore a difference in frequency-dependency of the cell sensitivity between the load cells as shown in FIG. 6, constants may be used as the correction ratios for the arithmetic correction processing of the detection signals of the load cells instead of the transfer functions. These constants may be set in advance based on the characteristics of the respective load cells.

Figure 8:
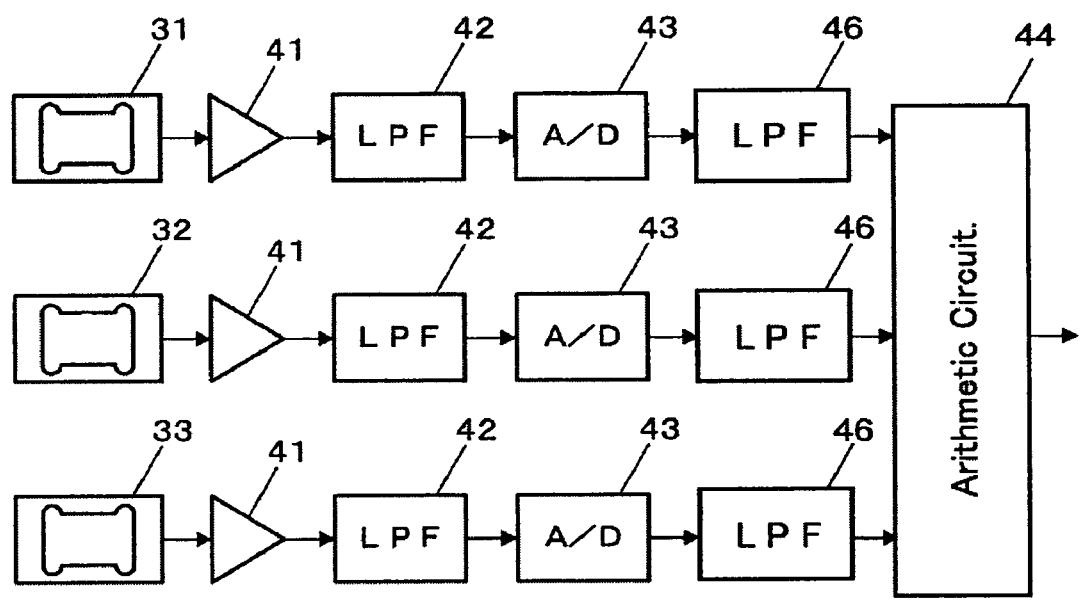
FIG. 8 is a block diagram showing a signal processing circuit according to another embodiment of the present invention.

(c) In the foregoing embodiments, the low-pass filter 45 is arranged immediately downstream from the arithmetic circuit 44. However, the low-pass filters 46 . . . 46 may be arranged downstream from each of the A/D converters 43 . . . 43 as shown in FIG. 8. Thereby, even in the case where the arithmetic circuit 44 has an insufficient capability with respect to the sampling periods of the detection signals of the load cells 31–33, the arithmetic circuit 44 can maintain its operation efficiency by arranging the low-pass filters 46 . . . 46 immediately downstream from each of the A/D converters 43 . . . 43.

The weight detecting apparatus according to the invention removes the influence of the vibration disturbance exerted from the device installation side and the object placing side, and thereby improves the detection precision. Thus, the invention can be appropriately applied to the field of weight detecting technology in connection with the weight detecting apparatus for precisely detecting the weight of an object placed thereon.

What is claimed is:

1. A weight detecting apparatus for detecting a weight of an object comprising:
   weight detecting means having a fixed end kept in a fixed state, and having a free end bearing a weight of the object;
   first vibration detecting means arranged on a fixed end side of said weight detecting means for detecting a vibration component;
   second vibration detecting means arranged on a free end side of said weight detecting means for detecting a vibration component; and
   weight calculating means for calculating the weight of the object based on detection signals provided from said weight detecting means and said first and second vibration detecting means, by removing the vibration components from the detection signal provided from said weight detecting means.

2. The weight detecting apparatus according to claim 1, wherein said weight calculating means calculates the vibration component on the free end side of said weight detecting means based on the detection signals provided from said first and second vibration detecting means.

3. The weight detecting apparatus according to claim 1, wherein said weight calculating means calculates the weight of the object by performing arithmetic processing for correction on the detection signals provided from said weight detecting means, said first vibration detecting means and said second vibration detecting means, and thereby removing the vibration component on said fixed end side and the vibration component on said free end side from the detection signal of said weight detecting means.

4. The weight detecting apparatus according to claim 1, wherein said weight calculating means has:
   A/D converters configured to receive the detection signals provided from said weight detecting means, said first vibration detecting means and said second vibration detecting means respectively,
   an arithmetic circuit configured to receive an output signal of said A/D converters, and
   a low-pass filter configured to receive an output signal of said arithmetic circuit.

5. The weight detecting apparatus according to claim 1, wherein said weight calculating means has:
   A/D converters configured to receive the detection signals provided from said weight detecting means, said first vibration detecting means and said second vibration detecting means respectively,
   low-pass filters configured to receive an output signal of said A/D converters, and
   an arithmetic circuit configured to receive an output signal of said low-pass filters.

6. A weight detecting apparatus for detecting a weight of an object comprising:
   a weight detecting device having a fixed end kept in a fixed state, and having a free end bearing a weight of the object;
   a first vibration detecting device arranged on a fixed end side of said weight detecting device for detecting a vibration component;
   a second vibration detecting device arranged on a free end side of said weight detecting device for detecting a vibration component; and
   a weight calculator for calculating the weight of the object based on detection signals provided from said weight detecting device and said first and second vibration detecting device, by removing the vibration components from the detection signal provided from said weight detecting device.

7. The weight detecting apparatus according to claim 6, wherein said weight calculator calculates the vibration component on the free end side of said weight detecting device based on the detection signals provided from said first and second vibration detecting device.

8. The weight detecting apparatus according to claim 6, wherein said weight calculator calculates the weight of the object by performing arithmetic processing for correction on the detection signals provided from said weight detecting device, said first vibration detecting device and said second vibration detecting device, and thereby removing the vibration component on said fixed end side and the vibration component on said free end side from the detection signal of said weight detecting device.

9. The weight detecting apparatus according to claim 6, wherein said weight calculator has:
   A/D converters configured to receive the detection signals provided from said weight detecting device, said first vibration detecting device and said second vibration detecting device respectively,
   an arithmetic circuit configured to receive an output signal of said A/D converters, and
   a low-pass filter configured to receive an output signal of said arithmetic circuit.

10. The weight detecting apparatus according to claim 6, wherein said weight calculator has:
    A/D converters configured to receive the detection signals provided from said weight detecting device, said first vibration detecting device and said second vibration detecting device respectively,
    low-pass filters configured to receive an output signal of said A/D converters, and an arithmetic circuit configured to receive an output signal of said low-pass filters.

* * * * *